Inventor
Alma J. Lundahl.

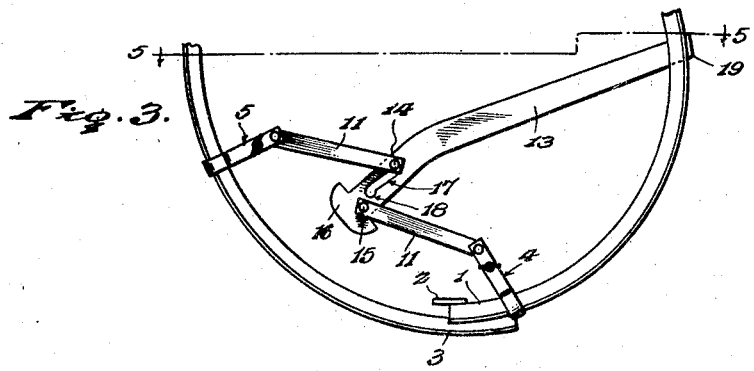
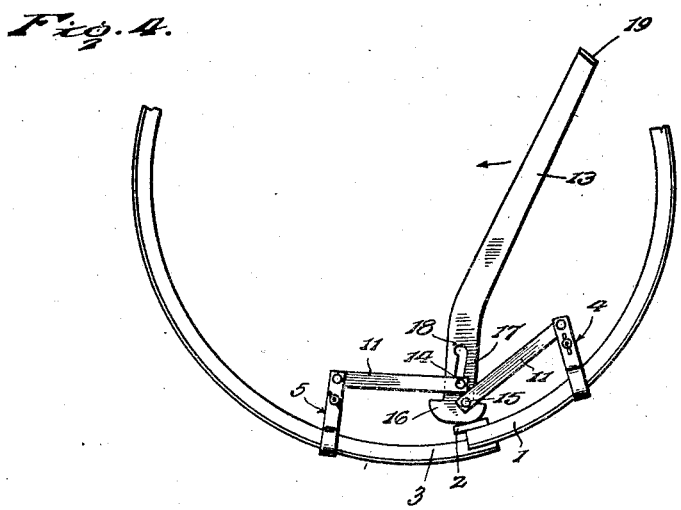
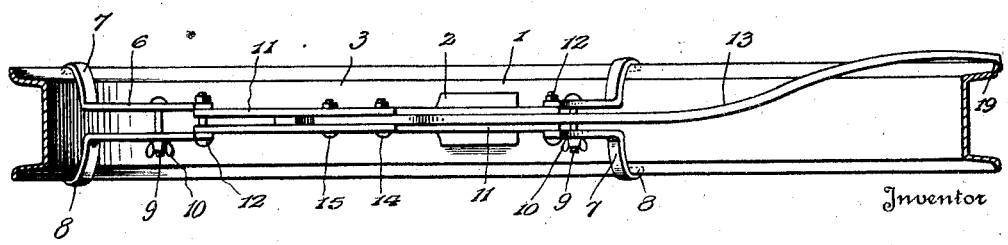

Patented Feb. 9, 1926.

1,572,298

UNITED STATES PATENT OFFICE.

ALMA J. LUNDAHL, OF LOGAN, UTAH.

RIM TOOL.

Application filed June 23, 1922. Serial No. 570,346.

*To all whom it may concern:*

Be it known that I, ALMA J. LUNDAHL, a citizen of the United States, residing at Logan, in the county of Cache and State of Utah, have invented certain new and useful Improvements in Rim Tools, of which the following is a specification.

My invention relates to tools for contracting and expanding rims to facilitate the removal of a tire therefrom or the securing of a tire thereon. The invention seeks to provide a device which will be simple and inexpensive in construction and efficient in operation and by the use of which both operations of contracting or expanding the rim may be readily performed. The invention is illustrated in the accompanying drawings and will be hereinafter fully set forth and defined.

In the drawings—

Figure 3 is a side elevation showing the third position of the tool and illustrating the tool operated to contract the rim and lock the rim in contracted position.

Figure 4 is a view similar to Figure 3, showing the fourth position of the tool and illustrating the manner in which the tool is operated to expand the rim.

Figure 5 is a sectional view on the line 5—5 of Figure 3, looking in the direction indicated by the arrows, and showing the structural details of the device.

Figure 1:
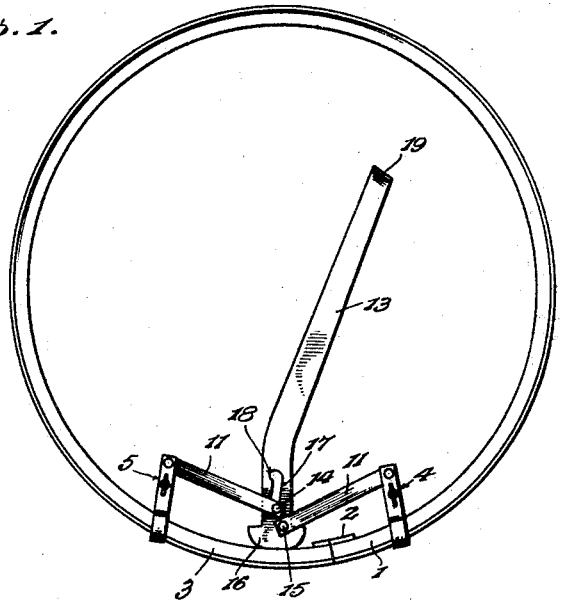
Figure 1 is a side elevation showing the initial position of the tool upon a rim.

The rim shown is of the usual cross sectional contour, being provided with side flanges to receive the tire in place, and is of that type having a transverse split therein. One end 1 of the rim is equipped with an overhanging clip plate 2 adapted to engage in a recess or its equivalent upon the opposite end 3 of the rim whereby the rim will be maintained normally in expanded circular form. My improved tool comprises companion rim engaging clamps 4 and 5 each of which, as shown most clearly in Figure 5, consists of mating clamping members having shanks 6 adapted to extend radially of the rim and having at their outer ends laterally turned portions 7 terminating in hooks 8 which are adapted to engage around the flanges of the rim, the transverse portions 7 bearing against the inner circumference of the rim. The shanks 6 of the mating clamping members are held together by a bolt 9 inserted transversely therethrough and equipped at one end with a winged nut 10 adapted to be turned home against the adjacent shank. The members may thus be readily brought into or released from engagement with the rim, as will be readily understood, so as to secure the tool in operative position or permit its release. Between the upper ends of each pair of shanks 6, I pivotally mount the outer ends of links 11 which, as shown most clearly in Fig. 5, are arranged in pairs having their outer ends pivotally fitted upon bolts or rivets 12 inserted transversely through the ends of the shanks. The inner ends of the links 11 are disposed at the sides of a lever 13, and pins or rivets 14 and 15 are carried by the inner ends of the links respectively. The pin 15 is inserted through the lever near the outer extremity of the same so as to occupy a fixed position upon the lever and the adjacent end of the lever is expanded so as to provide an eccentric or cam head 16. The pin 14 passes through and plays in a slot 17 formed longitudinally in the lever and having lateral upper and lower notches 18 in its opposite side walls at its opposite ends. The lever is given an appreciable length, as clearly shown in the drawings, and terminates at the end remote from the head 16 in a hook or overhanging lip 19 which is adapted to engage over one side flange of the rim, as will be presently specified.

Figure 2:
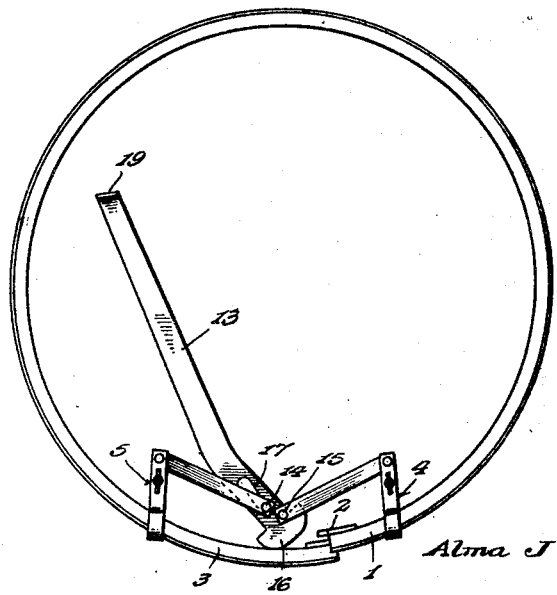
Figure 2 is a similar view showing the second position of the tool and illustrating the tool operated to break the rim.

In use, the tool is, as illustrated in Figure 1, initially applied to the rim by loosely engaging the clamps 4 and 5 with the rim ends 1 and 2 at about the positions shown so that the cam head 16 of the lever 13 rests against the rim end 3 near the terminal thereof while the pin 14 is shifted downwardly in the slot 17 of said lever to rest in the notch 18 at the lower end of said slot. The leverage on the clamps 4 and 5 is thus increased while the walls of said slot will coact with the pin for retaining the pin at the lower end of the slot. The clamps are then slid along the rim ends toward the terminals thereof for canting said clamps to grip the rim ends when, as shown in Figure 2, the lever 13 is swung to the left, as seen in the drawings, for breaking the rim. This movement of the lever causes the cam head 16 to press the rim ends 3 outwardly in a radial direction while the pull of the clamp 4 tends to strain the rim end 1 inwardly with the result that the rim ends are shifted out of register into slightly overlapping position.

Having broken the rim, the lever 13 is disposed approximately in the position shown in Figure 2, when the clamp 5 is, as shown in Figure 3, slid along the rim end 3 away from the terminal thereof to a position more or less distant from said terminal while the pin 14 is shifted upwardly in the slot 17 to rest in the notch 18 at the upper end of said slot. The throw to be imparted to the clamps 4 and 5, when the lever is swung, is thus increased proportionately and, as in the instance of the lower notch, the pin will be retained at the upper end of the slot by the upper notch. The lever 13 is then swung to the right for shifting the rim ends upon each other and contracting the rim, when the hook 19 is engaged over the adjacent side flange of the rim for locking the tool and maintaining the rim contracted. Accordingly, a tire may then be readily positioned upon or removed from the rim.

To again expand the rim, the hook 19 is, as shown in Figure 4, disengaged from the rim to free the lever 13, when the pin 14 is returned to the notch 18 at the lower end of the slot 17. The clamps 4 and 5 are then slid along the rim toward the right until the cam head 16 of the lever is disposed to rest on top of the plate 2 when the lever is swung to the right and the clamp 5 slid along the rim end 3 toward the terminal thereof for taking up slack in the connections between the clamps. The lever 13 is then swung to the left for spreading the clamps and shifting the rim ends out of overlapping relation. Coincidently, the cam head 16 is caused to press the rim end 1 outwardly in a radial direction while the pull on the clamp 5 strains the rim end 3 inwardly with the result that the rim ends are returned into registering abutting relation.

Having thus described the invention, what is claimed as new is:

1. A rim tool including a lever provided at its forward end with a cam head, links pivotally connected with the forward end portion of the lever in the rear of the head, and rim gripping elements carried by said links and engageable with the ends of a split rim to support said lever in a position having said cam head disposed to act against and press one of said rim ends out of register with the other end of the rim whereby the lever may be rocked for breaking the rim.

2. A rim tool including a lever provided at its forward end with a cam head and formed in its forward end portion with a longitudinally extending slot terminating in oppositely directed notches, a link having fixed pivotal connection at one end with the forward end portion of said lever, a second link provided at one end with a pin freely movable in said slot to selectively engage in said notches, and rim gripping clamps pivotally connected with the opposite ends of said links.

In testimony whereof I affix my signature.

ALMA J. LUNDAHL. [L. S.]